US010810234B2

(12) United States Patent
Han et al.

(10) Patent No.: US 10,810,234 B2
(45) Date of Patent: Oct. 20, 2020

(54) SEARCHING FOR AND DETERMINING RELATIONSHIPS AMONG ENTITIES

(71) Applicant: International Business Machines Corporation, Armonk, NY (US)

(72) Inventors: Yanyan Han, San Jose, CA (US); Xiaoyang Gao, San Jose, CA (US); William S. Spangler, San Martin, CA (US); Sheng Hua Bao, San Jose, CA (US); Brian S. Dreher, San Jose, CA (US)

(73) Assignee: International Business Machines Coproration, Armonk, NY (US)

( * ) Notice: Subject to any disclaimer, the term of this patent is extended or adjusted under 35 U.S.C. 154(b) by 242 days.

(21) Appl. No.: 15/961,046

(22) Filed: Apr. 24, 2018

(65) Prior Publication Data
US 2019/0325063 A1    Oct. 24, 2019

(51) Int. Cl.
*G06F 16/00*    (2019.01)
*G06F 16/28*    (2019.01)
*G06F 16/2457*   (2019.01)

(52) U.S. Cl.
CPC ...... *G06F 16/288* (2019.01); *G06F 16/24578* (2019.01)

(58) Field of Classification Search
CPC ............. G06F 16/288; G06F 16/24578; G06F 16/9038
See application file for complete search history.

(56) References Cited

U.S. PATENT DOCUMENTS

| | | | |
|---|---|---|---|
| 7,685,141 B2 | 3/2010 | Jadhav et al. | |
| 7,739,209 B1* | 6/2010 | Rajaraman | H04L 12/66 706/20 |
| 8,782,039 B2 | 7/2014 | Byrne et al. | |
| 9,146,986 B2 | 9/2015 | Dunn et al. | |
| 10,331,677 B1* | 6/2019 | Horowitz | G06F 16/22 |
| 2007/0011659 A1* | 1/2007 | Venolia | G06F 16/904 717/127 |

(Continued)

OTHER PUBLICATIONS

List of IBM Patents or Patent Applications Treated as Related, filed Jun. 24, 2019.

*Primary Examiner* — Leslie Wong
(74) *Attorney, Agent, or Firm* — Will Stock; SVL IPLaw (57) ABSTRACT

Methods, systems, and computer program products are provided for processing a request regarding relationships among instances of entities. A graphical representation of instances of entities is generated and includes one or more source nodes, each representing an instance of an input entity of a request, and one or more related nodes, each representing an instance of a second entity related to one or more corresponding instances of the input entity and associated with a corresponding confidence score for the relationship. Each of the one or more related nodes associated with a confidence score satisfying a threshold is identified. One or more supplemental nodes are added to the graphical representation, each of which represents a corresponding instance of a third entity with a relationship to a corresponding instance of the second entity. The graphical representation is traversed to identify relationships between instances of entities and produce results for the request.

11 Claims, 5 Drawing Sheets

(56) References Cited

U.S. PATENT DOCUMENTS

| | | | |
|---|---|---|---|
| 2010/0211924 A1* | 8/2010 | Begel | G06F 8/74 |
| | | | 717/101 |
| 2010/0312386 A1 | 12/2010 | Chrysanthakopoulos et al. | |
| 2014/0280224 A1* | 9/2014 | Feinberg | G06F 16/9024 |
| | | | 707/748 |
| 2016/0012336 A1 | 1/2016 | Franceschini et al. | |
| 2017/0270254 A1* | 9/2017 | Guney | G06F 19/326 |
| 2017/0293696 A1 | 10/2017 | Bendersky et al. | |
| 2018/0157662 A1* | 6/2018 | Chin | G06F 40/284 |
| 2019/0324976 A1 | 10/2019 | Han et al. | |

* cited by examiner

SEARCHING FOR AND DETERMINING RELATIONSHIPS AMONG ENTITIES

BACKGROUND

1. Technical Field

Present invention embodiments relate to methods, systems and computer program products for determining instances of entities having a direct or an indirect relationship with respect to instances of an input entity. In particular, present invention embodiments determine instances of one or more entities directly or indirectly related to instances of an input entity. Nodes are graphically displayed that represent the instances of the input entity and the entity instances directly or indirectly related to the input entity instances.

2. Discussion of the Related Art

A multi-hop relationship graph may be too crowded, with respect to relationships among some instances of entities, for a user to clearly understand the relationships. In some cases, a two-hop relationship graph may be too crowded for a user to understand the relationships among the instances of the entities. Accordingly, existing relationship graph applications search for entities related to an input entity and simply draw a one-hop relationship graph. However, a one-hop relationship graph may provide limited relationships between entity instances.

SUMMARY

According to a first aspect of embodiments of the invention, a machine-implemented method of processing a request regarding relationships among instances of entities is provided. A data processing system generates a graphical representation of instances of entities. The graphical representation includes one or more source nodes, each of which represents an instance of an input entity of a request, and one or more related nodes, each of which represents an instance of a second entity with a relationship to one or more corresponding instances of the input entity represented by the one or more source nodes and associated with a corresponding confidence score for the relationship. The data processing system identifies each of the one or more related nodes with a confidence score satisfying a threshold. One or more supplemental nodes are added to the graphical representation, each of which represents a corresponding instance of a third entity with a relationship to a corresponding instance of the second entity represented by a corresponding identified related node. The data processing system traverses the graphical representation to identify relationships between instances of entities and produce results for the request.

According to a second aspect of the embodiments of the invention, a system for processing a request regarding relationships among entities is provided. The system includes at least one processor and a memory connected to the at least one processor. The at least one processor is configured to generate a graphical representation of instances of entities including one or more source nodes and one or more related nodes. Each of the one or more source nodes represents an instance of an input entity of a request. Each of the one or more related nodes represents an instance of a second entity with a relationship to one or more corresponding instances of the input entity represented by the one or more source nodes and associated with a corresponding confidence score for the relationship. Each of the one or more related nodes with a confidence score satisfying a threshold is identified. One or more supplemental nodes are added to the graphical representation. Each of the one or more supplemental nodes represents a corresponding instance of a third entity with a relationship to a corresponding instance of the second entity represented by a corresponding identified related node; The graphical representation is traversed to identify relationships between instances of entities and produce results for the request.

According to a third aspect of the embodiments, a computer program product is provided for processing a request regarding relationships among entities. The computer program product includes at least one computer readable storage medium having computer readable program code embodied thereon for execution on at least one processor. The computer readable program code is configured to be executed by the at least one processor to generate a graphical representation of entities including one or more source nodes and one or more related nodes. Each of the one or more source nodes represents an instance of an input entity of a request. Each of the one or more related nodes represents an instance of a second entity with a relationship to one or more corresponding instances of the input entity represented by the one or more source nodes and is associated with a confidence score for the relationship. One or more of the related nodes with a confidence score satisfying a threshold is identified. One or more supplemental nodes are added to the graphical representation. Each of the one or more supplemental nodes represents a corresponding instance of a third entity with a relationship to a corresponding instance of the second entity represented by a corresponding identified related node. The graphical representation is traversed to identify relationships between instances of entities and produce results for the request.

BRIEF DESCRIPTION OF THE DRAWINGS

Generally, like reference numerals in the various figures are utilized to designate like components.

DETAILED DESCRIPTION

In various embodiments, an input entity may be provided. A computing system may search a relationship database for instances of a second entity that is likely to be related to one or more instances of the input entity. Each instance of the second entity has an associated confidence score indicative of a probability of a relationship with respect to an instance of the input entity. The computing system may generate a graphical representation including one or more source nodes, representing corresponding instances of an input entity. Each of the one or more source nodes has a respective associated confidence score of 100% regarding a probability of a relationship to the instance of the input entity (i.e., a relationship to itself). Each of the instances of the second entity that is likely to be related to a corresponding instance of the input entity may be represented in the graphical representation as a respective related node having a link to the corresponding source node representing a corresponding instance of the input entity. Each link has an associated confidence score indicating a likelihood of a relationship between the instances of the linked entities. Each node that represents a respective instance of an entity other than an instance of the input entity has an associated confidence score that is equal to a product of a confidence score of a corresponding prior node (representing a corresponding prior instance of a prior entity) and a confidence score of a link to that node (representing a probability of a relationship between the prior instance of the prior entity and the respective instance of the other entity).

The confidence scores, CS, are determined as follows:

CS[instance of input entity]=100%

CS[relationship between a pair of instances of entities]=probability of a relationship between the two instances CS[instance of a non-input entity]=CS[prior instance of prior entity]×CS[relationship between instance of prior entity and the instance of non-input entity].

When the instance of the non-input entity is directly related to an instance of the input entity, then the confidence score is equal to the confidence score of a relationship between the instance of the input entity and the instance of the second entity.

Thus, for example, if a confidence score of a prior instance of a prior entity is 80% and a confidence score of a relationship between an instance of a non-input entity and the prior instance of the prior entity is 75%, then the confidence score of the instance of the non-input entity is a product of 80% and 75%, which is equal to 60%. In this example, the instance of the non-input entity is related to a corresponding instance of an input entity with a confidence score of 60%.

In some embodiments, only nodes (e.g., source nodes, nodes linked to source nodes, and non-source nodes having a direct relationship with a prior non-source node that has a corresponding associated confidence score greater than or equal to a threshold) may be displayed.

Figure 1:
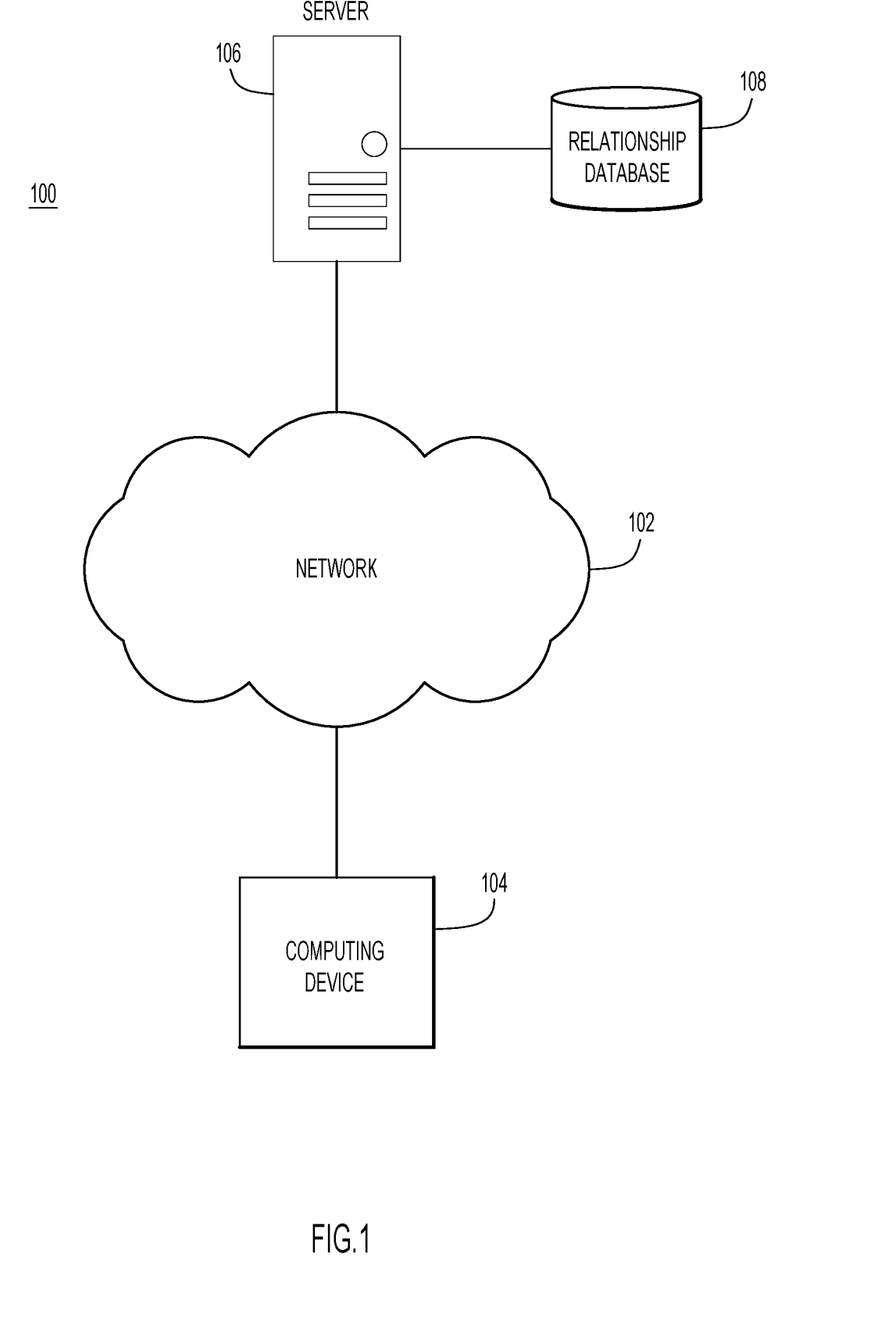
FIG. 1 illustrates an example environment in which various embodiments of the invention may operate.

FIG. 1 illustrates an example environment 100 in which various embodiments may operate. Example environment 100 may include a network 102 to which are connected, via a wired or wireless connection, a computing device 104 and a server 106 having access to a relationship database 108. Relationship database 108 may be directly connected with server 106 or may be accessed by server 106 via network 102. In some embodiments, relationship database 108 may include multiple relationship databases that are either directly connected with server 106 or connected with server 106 via network 102.

Network 102 may be implemented by any number of any suitable communications media (e.g., wide area network (WAN), local area network (LAN), Internet, Intranet, etc.) or a combination of any of the suitable communications media. Network 102 may further include wired and/or wireless networks.

Computing device 104 may include a desktop computer, a laptop computer, a smartphone, a tablet computer, or other type of computing device. Server 106 may include a single computer or may include multiple computers configured as a server farm. The one or more computers of server 106 may include a mainframe computer, a desktop computer, or other types of computers.

Alternatively, embodiments of the invention may be implemented by a standalone computing device 104 that may include document database 108.

Figure 2:
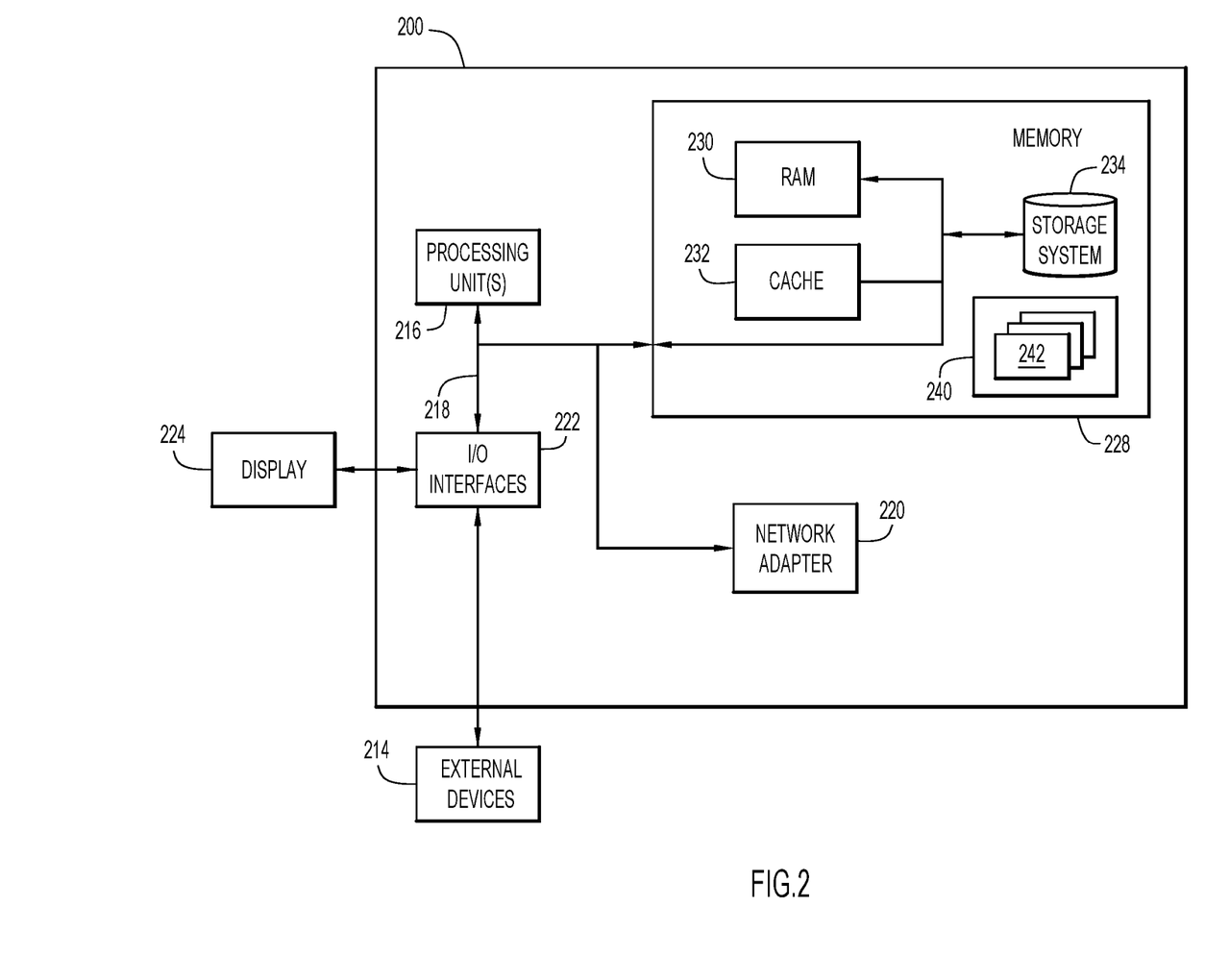
FIG. 2 illustrates an example computing system that may implement a computing device or a server according to embodiments of the invention.

Referring now to FIG. 2, a schematic of an example computing system 200 is shown. Computing system 200 may implement computing device 104 and/or server 106. Computing system 200 is shown in a form of a general-purpose computing device. Components of computing system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include a variety of computer system readable media. Such media may be any available media that is accessible by computing system 200, and may include both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, one or more displays 224, one or more devices that enable a user to interact with computing system 200, and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 218. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
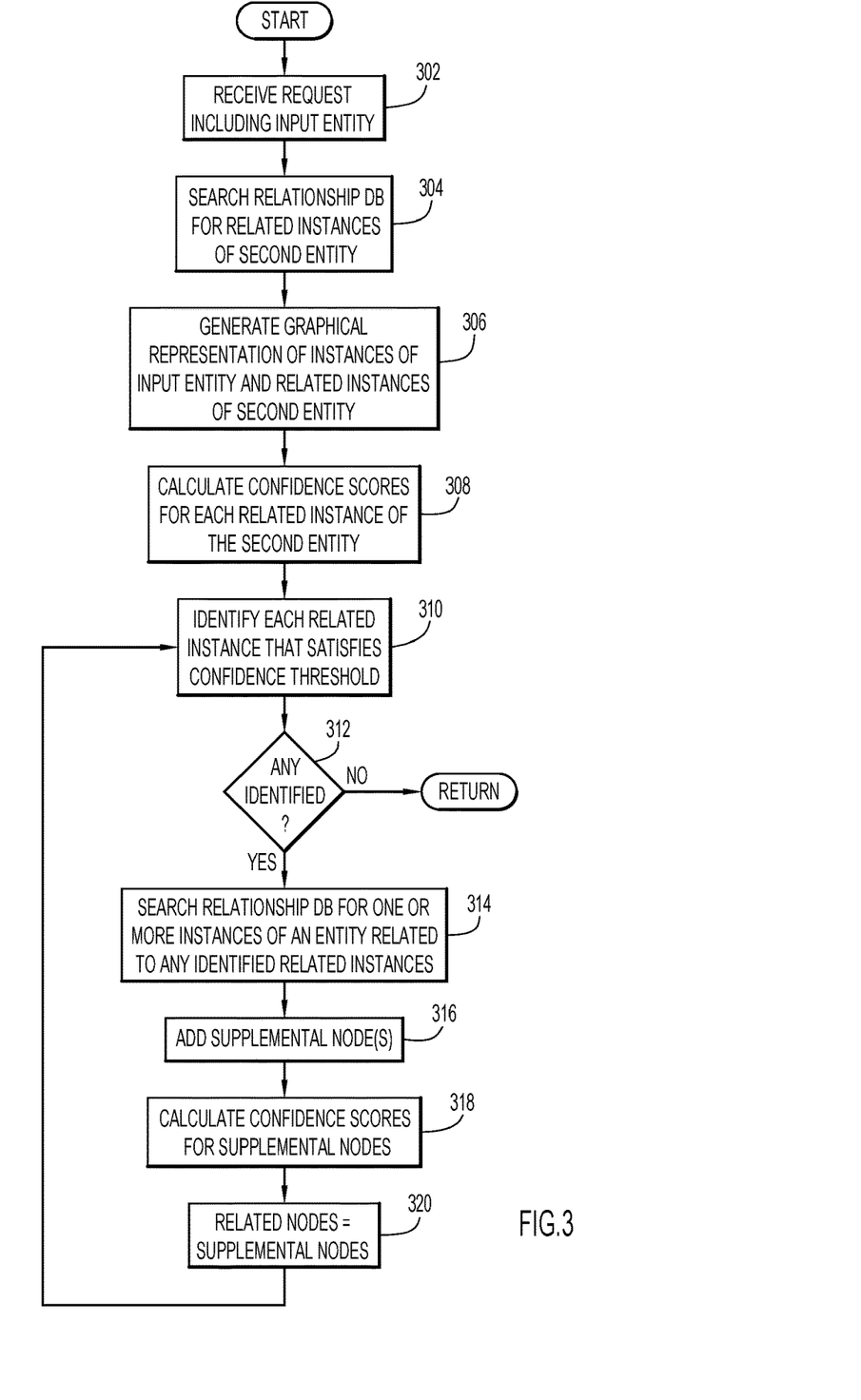
FIG. 3 is a flowchart of an example process for finding related instances of entities and generating a graphical representation including nodes, representing instances of entities, and links between nodes, representing relationships between pairs of nodes, according to embodiments of the invention.

FIG. 3 is a flowchart of an example process for receiving a request including an input entity, finding instances of entities directly or indirectly related to one or more instances of the input entity, and graphically representing one or more nodes corresponding to instances of one or more entities, while pruning the graphical representation based on confidence scores associated with the one or more nodes. The process may be implemented on server 106, which may receive a request including the input entity from computing device 104. Alternatively, the process may be implemented on computing device 104 having access to document database 108 either directly or via network 102. As a second alternative, server 106 may receive the request including the input entity from a keyboard connected with server 106. A graphical representation may be displayed on a monitor of computing device 104 or server 106. In the following description of example processing, the term "processing device" may refer to either computing device 104 or server 106.

The process may begin with a processing device receiving a request including the input entity, which may also be referred to as a source entity (act 302). The processing device may then access relationship database 108 and may search for and collect instances of a second entity related to instances of the input entity (act 304). Relationship database 108 may include relationships between pairs of instances of entities and a confidence score for each of the relationships between the corresponding pairs of the instances of the entities.

Next, the processing device may generate a graphical representation including one or more source nodes, representing one or more corresponding instances of the input entity, and related nodes, representing corresponding instances of the second entity related to respective instances of the input entity (act 306). The processing device may then calculate a confidence score for the corresponding instances of the second entity represented by the related nodes in the graphical representation (act 308). The confidence score for each of the corresponding instances of the second entity is equal to a product of the confidence score of the instance of the input entity and the confidence score of a link representing a relationship between the instance of the input entity and a corresponding instance of the second entity. Instances of the input entity have a confidence score of 100%. Therefore, the confidence score of each respective instance of the second entity having a direct relationship with a corresponding instance of the input entity is a product of the confidence score of the corresponding instance of the input entity and the confidence score of the relationship between the corresponding instance of the input entity and the respective instance of the second entity, which is equivalent to the confidence score of the relationship between the corresponding instance of the input entity and the respective instance of the second entity.

The processing device may then identify each related node, representing corresponding instances having a confidence score greater than or equal to a threshold (act 310). If there are no identified related nodes (act 312), then the process is completed. Otherwise, the processing device may search relationship database 108 for instances of one or more other entities related to any of the identified related nodes (act 314).

For each instance of another entity that is likely to be related to any of the identified instances, a supplemental node representing the instance of the another entity may be added to the graphical representation with a link connecting the instance of the another entity with each corresponding instance of the any of the identified related instances (act 316). The processing device may then calculate a confidence score for each of the added supplemental nodes based on a product of a confidence score for a link, representing a relationship between the each of the added supplemental nodes and a respective prior node, and a confidence score of the respective prior node (act 318).

Next, the processing device may set each of the supplemental nodes to a related node (act 320) such that each instance of an entity corresponding to a respective supplemental node is to be treated as a related instance corresponding to a related node. Acts 310-320 may again be performed and may continue to be repeated until, at act 312, no related instances are identified as satisfying the confidence threshold. A representation of the graph may be stored such that the graph may be traversed to determine a probability of a relationship between an instance of a requested input entity and another entity instance by traversing the representation of the graph, thereby reducing processing time needed to find a related entity instance.

Figure 4:
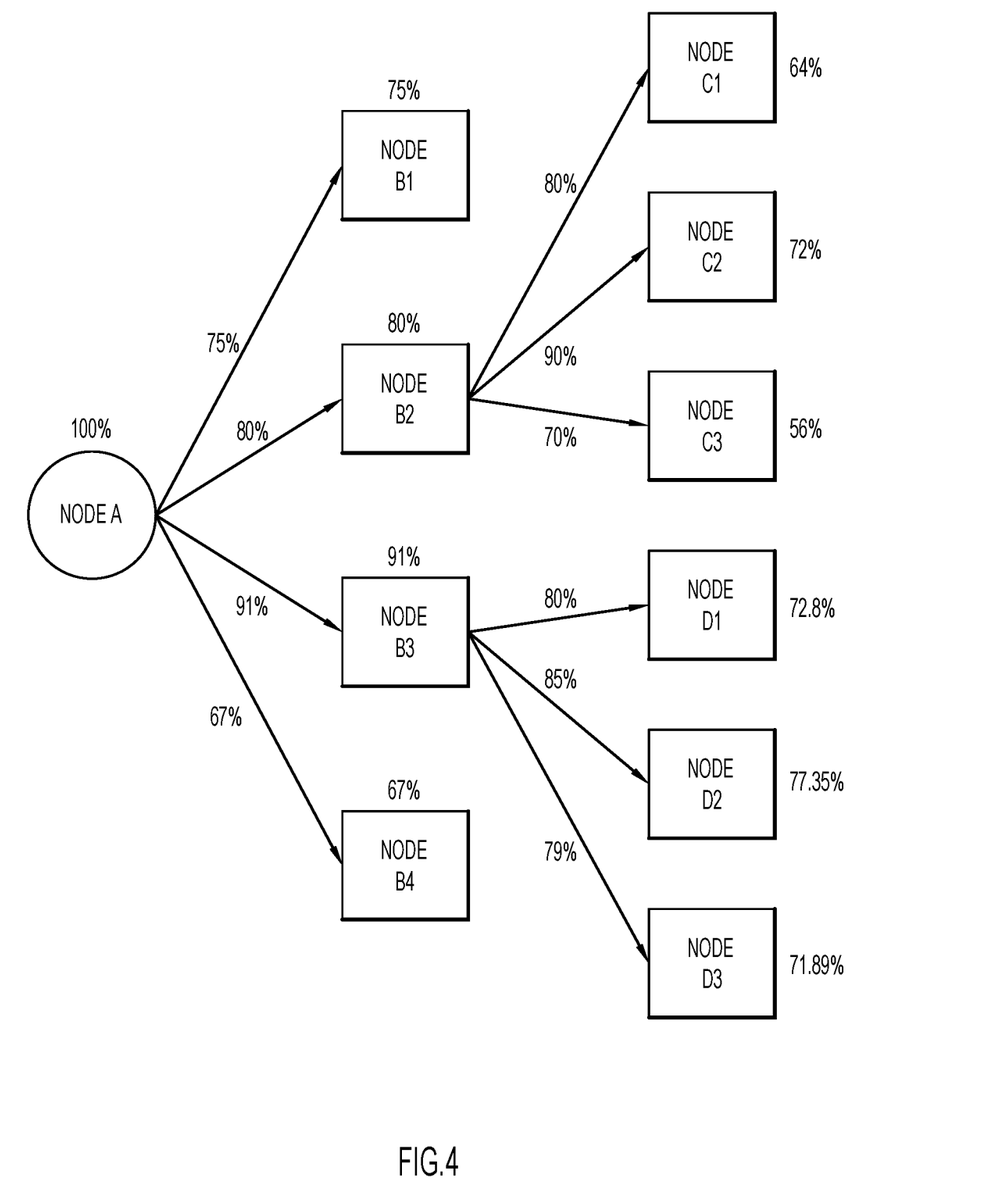
FIG. 4 shows an example graphical representation of nodes, links between related nodes, and confidence scores of nodes and links according to embodiments of the invention.

FIG. 4 illustrates a graphical representation of related instances of entities according to an embodiment of the invention. Node A represents an instance of an input entity, also referred to as a source entity. As previously mentioned, instances of an input entity have a confidence score of 100%. Thus, in FIG. 4, node A has a confidence score of 100% as indicated. A search of document database 108 found instances of a second entity that are likely related to the instance of the input entity represented by node A. The found instances of the second entity are represented, respectively, by node B1, node B2, node B3 and node B4 in FIG. 4. Respective links between node A and each of node B1, node B2, node B3 and node B4 have a confidence score of a relationship with the instance of the input entity, represented by node A, of 75%, 80%, 91% and 67%, respectively. The confidence score of each of nodes B1, B2, B3 and B4 is, respectively, the confidence score of node A multiplied by the confidence score of the respective link from node A. As a result, the confidence score for each of nodes B1, B2, B3 and B4, respectively, is 75%, 80%, 91% and 67%.

A confidence score threshold may be configurable according to some embodiments. For this example, the confidence score threshold is 80%. In other embodiments, the confidence score threshold may be 75%, 90%, 95% or another suitable value.

Various embodiments may identify related nodes from among nodes B1, B2, B3 and B4 that satisfy the confidence score threshold. For this example, the nodes that satisfy the confidence score threshold of 80% are nodes B2 and B3. According to embodiments of the invention, if any of the related nodes are identified as satisfying the confidence score threshold, then document database 108 may be searched to identify instances of a third entity related to instances of the second entity. If any related instances of the third entity are found, the instances of the third related entity are added as supplemental nodes to the graphical representation and a link from respective supplemental nodes to the corresponding related nodes may be included in the graphical representation. In the example of FIG. 4, nodes C1, C2 and C3 are supplemental nodes representing instances of a third entity related to node B2. Links between node B2 and respective nodes C1, C2 and C3 have a confidence score regarding a relationship of 80%, 90% and 70%. Therefore, the confidence score of node C1 is 80%×80%, which is 64%, the confidence score of node C2 is 80%×90%, which is 72%, and the confidence score of node C3 is 80%×70%, which is 56%. The confidence score of each of nodes C1, C2 and C3 indicates a probability of a relationship between a respective instance of a third entity and the instance of the input entity represented by node A.

Similarly, nodes D1, D2, and D3, corresponding to instances of the third entity, may be found by searching document database 108 for instances of the third entity related to node B3, representing a second instance of the second entity. Nodes D1, D2 and D3 may be added as supplemental nodes related to node B3. Links between node B3 and each of nodes D1, D2 and D3 may be added to the graphical representation to indicate respective relationships having respective confidence scores of 80%, 85% and 79%. Therefore, the confidence score of node D1 is 91%×80%, which is 72.8%, the confidence score of node D2 is 91%× 85%, which is 77.35%, and the confidence score of node D3 is 91%×79%, which is 71.89%. Since no instances of the third entity are greater than or equal to the threshold of 80%, searching for additional entity instances related to the supplemental nodes is not performed and no additional nodes are added to the graphical representation.

Figure 5:
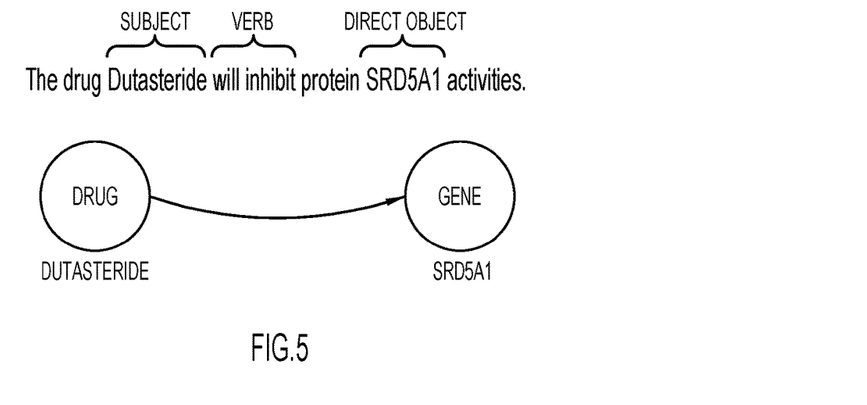
FIG. 5 illustrates an example sentence indicating a relationship between an instance of a drug and an instance of a gene, as well as a graphical representation of the relationship.
Figure 6:
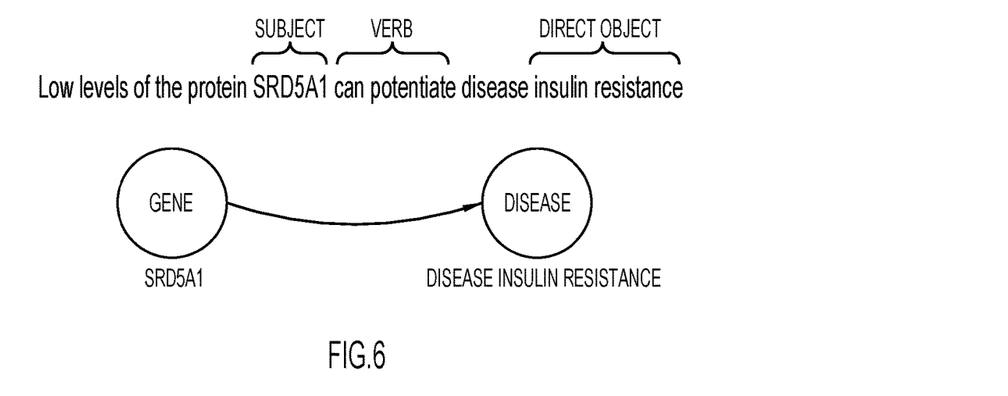
FIG. 6 illustrates a second example sentence indicating a second relationship between the instance of the gene and an instance of a disease, as well as a graphical representation of the second relationship.
Figure 7:
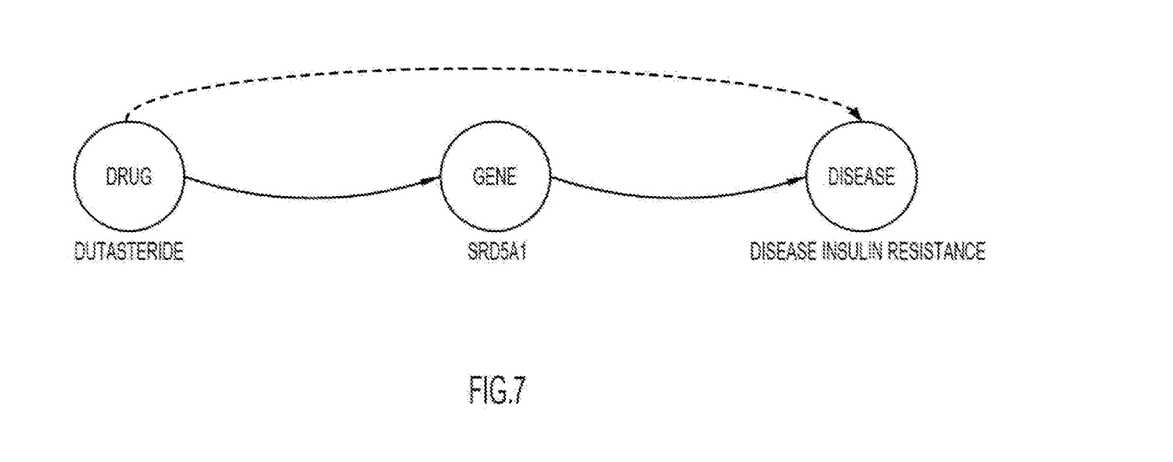
FIG. 7 illustrates the relationship between the instance of the drug and the instance of the gene, a second relationship between the instance of the gene and the instance of the disease, and an indirect relationship between the instance of the drug and the instance of the disease.

FIGS. 5-7 illustrate how relationships between pairs of instances of entities may be discovered in a document database when building relationship database 108. A computing device may search the document database to examine sentences in documents of the document database in order to find a sentence having one of a number of particular verbs, an instance of a first entity as a subject of the one of the particular verbs, and an instance of a second entity as a direct object of the one of the particular verbs in the sentence. In FIG. 5, the first entity is a drug and the second entity is a gene. In the sentence of FIG. 5, "will inhibit" is the verb, Dutasteride is a subject of the verb and is identified as an instance of the first entity, and SRD5A1 is a direct object of the verb and is identified as an instance of the second entity. Thus, the drug, Dutasteride, is identified as being related to the gene, SRD5A1 and the instances may be added to relationship database 108.

A confidence score with respect to the relationship between Dutasteride and SRD5A1 may be determined based on a number of documents of the document database that indicate existence of the relationship by having at least one sentence that includes one of the particular verbs, Dutasteride as the subject of the one of the particular verbs, and SRD5A1 as the direct object of the one of the particular verbs. The greater the number of documents in document database 108 that indicate the existence of the relationship, the higher the confidence score. The confidence score of a link representing a relationship between two instances of different entities may be calculated by any known method. The confidence score of a link may be calculated by determining a number of documents of the document database that have a sentence in which the instance of a first entity is a subject of one of the particular verbs and the instance of a second entity is a direct object of the one of the particular verbs divided by a number of documents in which the instance of the first entity is mentioned. In another embodiment, the number of documents that have the sentence in which the instance of the first entity is the subject of the one of the particular verbs and the instance of the second entity is the direct object of the one of the particular verbs is divided by a total number of documents in document database 108. The confidence scores of relationships or links may be included in relationship database 100.

The computing device may search the document database to determine whether a relationship exists between the gene, SRD5A1, and an instance of a third entity. In FIG. 6, the third entity is a disease. An example sentence that may be found in some documents of the document database when searching for relationships may be, "Low levels of the protein SRD5A1 can potentiate disease insulin resistance", as shown in FIG. 6. In this example, the particular verb is "can potentiate", the subject of the verb is SRD5A1 and the direct object of the verb is disease insulin resistance. A confidence score with respect to a relationship between the gene, SRD5A1, and the disease, disease insulin resistance, may be calculated via any of the methods previously described.

FIG. 7 shows the drug, Dutasteride, related to the gene, SRD5A1, which is related to the disease, disease insulin resistance. The dashed line represents the indirect relationship between the drug, Dutasteride, and the disease, disease insulin resistance. In various embodiments, the confidence score of the disease, disease insulin resistance, being related to the instance of the input entity, Dutasteride, is the confidence score of the previous instance of the entity, SRD5A1, multiplied by the confidence score of the link representing the relationship between SRD5A1 and disease insulin resistance.

Embodiments of the invention have reduced processing time for generating a graph while pruning the graph by searching for only instances of entities that are related to instances of non-source entities that have corresponding confidence scores that satisfy a threshold, thereby eliminating processing associated with finding relationships among instances of entities that are of less interest. In some embodiments, the threshold may be user-configurable.

It will be appreciated that the embodiments described above and illustrated in the drawings represent only a few of the many ways of implementing various embodiments for processing a request regarding relationships among instances of entities.

The environment of the present invention embodiments may include any number of computer or other processing systems and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A system for processing a request regarding relationships among instances of entities, the system comprising:
   at least one processor; and
   a memory connected to the at least one processor, wherein the at least one processor is configured to perform:
   generating a graphical representation of instances of entities, wherein the graphical representation includes one or more source nodes, each representing an instance of an input entity of a request, and one or more related nodes, each representing an instance of a second entity with a relationship to one or more corresponding instances of the input entity represented by the one or more source nodes and associated with a corresponding confidence score for the relationship based on a number of documents in a document database having a sentence in which the instance of the input entity is a subject of one of a plurality of particular verbs and the instance of the second entity is a direct object of the one of the plurality of particular verbs;
   identifying each of the one or more related nodes with a confidence score satisfying a threshold;
   adding one or more supplemental nodes to the graphical representation, each of the one or more supplemental nodes representing a corresponding instance of a third entity with a relationship to a corresponding instance of the second entity represented by a corresponding identified related node; and
   traversing the graphical representation to identify relationships between instances of entities and produce results for the request.

2. The system of claim 1, wherein the confidence score indicates a probability of a relationship between instances of related entities.

3. The system of claim of claim 1, wherein the at least one processor is further configured to perform:
iteratively adding one or more additional nodes to the graphical representation for nodes of the graphical representation having a corresponding confidence score satisfying the threshold, wherein each additional node represents an instance of an additional entity with a relationship to a corresponding instance of an entity represented by a node of the graphical representation.

4. The system of claim 1, wherein the confidence score for the one or more source nodes is predetermined, and the confidence score for the related and supplemental nodes is a product of confidence scores for one or more prior nodes and confidence scores for one or more links within a corresponding path of the graphical representation, each of the one or more links representing a relationship between instances of entities represented by a corresponding pair of nodes connected by the each of the one or more links.

5. The system of claim 1, wherein each of the one or more source nodes representing a corresponding input entity has an associated confidence score of 100%.

6. The system of claim 1, wherein:
the input entity is a drug,
the second entity represented by the each identified related node is a gene, and
the third entity represented by each of the supplemental nodes is a disease.

7. A computer program product comprising at least one computer readable storage medium having computer readable program code embodied therewith for execution on at least one processor, the computer readable program code being configured to be executed by the at least one processor to perform:
generating a graphical representation of entities, wherein the graphical representation includes one or more source nodes each representing an instance of an input entity of a request, and one or more related nodes each representing an instance of a second entity with a relationship to one or more corresponding instances of the input entity represented by the one or more source nodes and associated with a corresponding confidence score for the relationship based on a number of documents in a document database having a sentence in which the instance of the input entity is a subject of one of a plurality of particular verbs and the instance of the second entity is a direct object of the one of the plurality of particular verbs;
identifying each of the one or more related nodes with a confidence score satisfying a threshold;
adding one or more supplemental nodes to the graphical representation, wherein each of the one or more supplemental nodes represents a corresponding instance of a third entity with a relationship to a corresponding instance of the second entity represented by a corresponding identified related node; and
traversing the graphical representation to identify relationships between instances of entities and produce results for the request.

8. The computer program product of claim 7, wherein the confidence score indicates a probability of a relationship between instances of related entities.

9. The computer program product of claim 7, wherein the computer readable program code is further configured to be executed by the at least one processor to perform:
iteratively adding one or more additional nodes to the graphical representation for nodes of the graphical representation having a corresponding confidence score satisfying the threshold, wherein each additional node represents an instance of an entity with a relationship to a corresponding instance of an entity represented by a node of the graphical representation.

10. The computer program product of claim 7, wherein the confidence score for the one or more source nodes is predetermined, and the confidence score for the related and supplemental nodes is a product of confidence scores for one or more prior nodes and confidence scores for one or more links within a corresponding path of the graphical representation, each of the one or more links representing a relationship between instances of entities represented by a corresponding pair of nodes connected by the each of the one or more links.

11. The computer program product of claim 7, wherein:
each of the one or more source nodes representing a corresponding input entity has an associated confidence score of 100%,
the input entity is a drug,
the second entity represented by the each identified related node is a gene, and
the third entity represented by each of the supplemental nodes is a disease.

* * * * *